Patented June 29, 1937

2,085,476

UNITED STATES PATENT OFFICE 2,085,476

PROCESS OF SYNTHETICALLY PREPARING β(10)-HYDROXYCAMPHOR

Yoshikazu Sahashi, Meguro-ku, Kunijiro Takeuchi, Setagaya-ku, Tsuruzo Shimamoto, Yodobashi-ku, and Tsuneyasu Iki, Omori-ku, Tokyo, Japan, assignors to Zaidan Hojin Rikagaku Kenkyujo, Tokyo, Japan No Drawing. Application April 30, 1935, Serial No. 19,116. In Japan May 17, 1934

1 Claim. (Cl. 260—133)

This invention relates to a process of synthetically preparing β(10)-hydroxycamphor from β(10)-halogencamphor with alkaline salts of organic acids, so as to form the esters of the corresponding acids, and by saponifying the esters with alkalies, and also of preparing β(10)-apocamphor-1-aldehyde by oxidizing the β(10)-hydroxycamphor with chromic anhydride, bichromic acid, or their salts at a low temperature in the presence of an organic acid as a solvent. The object of the invention is to easily prepare in a pure state β(10)-apocamphor-1-aldehyde, effective as a cardiac stimulant.

To fully explain, according to the invention β(10)-halogencamphor is heated with alkaline salts, say potassium salts of organic acids, such as acetic, propionic or benzoic acid, to form the corresponding esters and the latter are treated with alkalies so as to produce β(10)-hydroxycamphor. The β(10)-hydroxycamphor thus obtained can be refined by recrystallization from a suitable solvent, such as water, alcohol, petroleum ether, or petroleum benzene, thereby giving substantially a theoretical yield of the pure crystalline product. The β(10)-hydroxycamphor thus obtained, is dissolved in organic acid such as acetic or propionic acid, and treated with chromic anhydride, bichromic acid, or their salts, directly or dissolved in organic acid, such as acetic or propionic acid, at a low temperature, for instance, +10° C., to —20° C., and the mixture is left for, say, about ten minutes and thus β(10)-apocamphor-1-aldehyde is produced. The final product β(10)-apocamphor-1-aldehyde can be refined, availing of its property of forming a molecular compound with sodium bisulphite, and thereafter by recrystallizing from a solvent such as water, alcohol, petroleum benzene, or petroleum ether. A pure crystalline product can thus be obtained.

In the following examples, the method of preparing β(10)-hydroxycamphor is firstly given.

*Example 1.*—20 grs. β(10)-bromocamphor prepared by the method of Armstrong and Lowry (see "Journal of the Chemical Society of London", 1902, vol. 81), are heated for ten hours in a vessel provided with a reflux condenser, together with 30 grs. anhydrous potassium acetate and 20 grs. glacial acetic acid. After cooling, the mixture is diluted with water, neutralized with sodium carbonate, and extracted with ether. The ethereal extract is distilled under reduced pressure, and the fraction distilling between 128–130° C. at 4–5 mm. is collected, saponified with 10% alcoholic potash for 30 minutes under heating, neutralized with carbonic acid, and evaporated to expel off the alcohol. The mixture is then diluted with water and extracted with ether. When the ethereal extract is concentrated, β(10)-hydroxycamphor separates out in crystalline form which is recrystallized from petroleum ether. The yield is 14 grs. It forms prismatic crystals melting at 215° C. Its specific rotation is +52° (4% solution of absolute alcohol). The analysis gives carbon 71.27% and hydrogen 9.68% while the theory requires; carbon 71.37%, and hydrogen 9.65%.

*Example 2.*—20 grs. α,β(3,10)-dibromocamphor obtained by the method of Swarts (see Berichte der Deutchen Chemischen Gesellschaft, 1882, 15, 2135) are heated for 10 hours with 30 grs. anhydrous potassium acetate and 20 grs. glacial acetic acid, in a vessel provided with a reflux condenser. After cooling, the mixture is diluted with water, neutralized with sodium carbonate, and extracted with ether. The ethereal extract is distilled under reduced pressure, and α(3)-bromo-β(10)-acetoxylcamphor is obtained in the fraction distilling between 160–165° C. at 6–7 mm. This distillate is dissolved in acetic acid, treated with zinc dust or other reducing agent, so as to remove the bromine attaching to the position of α(3)-, again neutralized with sodium carbonate, and extracted with ether. The ethereal extract is, after evaporating off the ether, subjected to fractional distillation under reduced pressure, and the distillate obtained between 128–130° C. at 4–5 mm. is saponified by heating for 30 minutes with 10% alcoholic potash, neutralized with carbonic acid, and after removal of alcohol, the mixture is diluted with water, and extracted with ether. The ether extract gives on evaporation β(10)-hydroxycamphor which when recrystallized from petroleum ether, forms prismatic crystals, melting at 215° C. Its specific rotation is +52.5° (4% solution of absolute alcohol). It has the same properties as the product obtained in Example 1. The analysis gives carbon 71.05% and hydrogen 9.56% (theoretically; carbon 71.37% and hydrogen 9.65%).

*Example 3.* — α(3)-*bromo*-β(10)-acetoxylcamphor obtained as the intermediate product in Example 2, is saponified by heating with 10% alcoholic potash for 30 minutes, neutralized with carbonic acid, alcohol is removed by evaporation, diluted with water and extracted with ether. The ethereal extract is evaporated, dissolved in acetic acid, treated with zinc dust or other reducing agent to remove the bromine at the position of α(3)-, again neutralized with sodium carbonate, and extracted with ether. From the ethereal extract, after evaporation and recrystallization from petroleum ether, β(10)-hydroxycamphor is obtained.

Example 4.—In Example 1 β(10)-chlorcamphor can also be used as the starting material, the operation being entirely the same as already described.

The following formula is assigned to β(10)-hydroxycamphor:

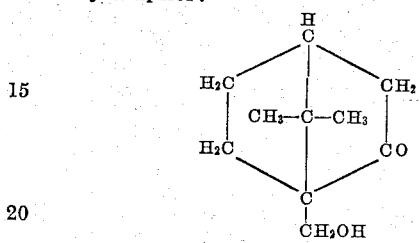

This substance has the properties of primary alcohols, is easily soluble in alcohol, acetic acid or ether, less easily in ligroin, petroleum ether or petroleum benzene, and still less in water. When oxidized with sulphuric acid and potassium bichromate, it is converted to (10)-apocamphor-1-aldehyde melting at 203° C. and β(10)-aprocamphor-1-carboxylic acid melting at 234° C. The analysis of the carboxylic acid gives carbon 65.90% and hydrogen 8.00% (theoretically; carbon 65.89% and hydrogen 7.85). This acid is proved to be identical with the ketopinic acid obtained by Armstrong, Gilles and Renwick— (J. C. S. 1896. 69 1401). The β(10)-hydroxycamphor obtained as above, is now used as a starting material for the preparation of its oxidation product, i. e. β(10)-apocamphor-1-aldehyde. The process is described in the following example.

Example 5.—5 grs. β(10)-hydroxycamphor obtained in either one of the foregoing Examples 1–4, are dissolved in 30 cc. glacial acetic acid, cooled to 5° C., and treated with 2.5 grs. chromic anhydride with agitation. The mixture is kept for 30 minutes at the said temperature, while agitation is continued. Thereafter, 50 cc. cold water are added and extracted with ether. The ether extract is washed with sodium carbonate solution to remove the acidic substances and evaporated, whereby crude crystals of β(10)-apocamphor-1-aldehyde is obtained. For purification, the crude product is dissolved in 20 cc. saturated solution of sodium bisulphite under heating. After cooling, the solution is extracted with ether, so as to remove the impurities which do not form molecular compounds with sodium bisulphite. The solution is then made alkaline by the addition of sodium carbonate, and heated to decompose the molecular compound of β(10)-apocamphor-1-aldehyde and sodium bisulphite. After cooling, the solution is extracted with ether. On evaporation the ethereal solution gives crystals which is further refined by recrystallization from petroleum ether. The yield of pure crystals is 0.5 g. Its melting point is 203° C. Its specific rotation is +73° (4% solution of absolute alcohol). The analysis gives carbon 71.65% and hydrogen 8.96% (theoretically; carbon 72.28% and hydrogen 8.43%).

This compound is assumed to have the following formula:

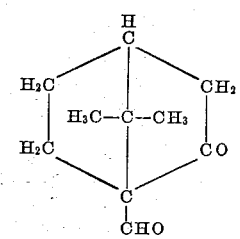

This substance possesses the general properties of aldehydes. When oxidized, it is transformed into β(10)-apocamphor-1-carboxylic acid. From this fact it is assumed to be β(10)-apocamphor-1-aldehyde.

In the above examples propionic acid can be used instead of glacial acetic acid, and also bichromic acid or its sodium or potassium salt in place of chromic anhydride without departing from the principle of the invention, they all give the same or similar result.

We claim:

A process of synthetically preparing β(10)-hydroxycamphor, consisting in heating β(10)-halogen-camphor with an alkali metal salt of an organic acid selected from the group of acetic, propionic and benzoic acids to form the corresponding ester and saponifying the ester by treating with an alkali.

YOSHIKAZU SAHASHI.
KUNIJIRO TAKEUCHI.
TSURUZO SHIMAMOTO.
TSUNEYASU IKI.